Patented Sept. 3, 1940

2,213,546

UNITED STATES PATENT OFFICE 2,213,546

COLORED PIGMENT

Charles Dangelmajer, Niagara Falls, N. Y., assignor to E. I. du Pont de Nemours & Company, Wilmington, Del., a corporation of Delaware No Drawing. Application November 23, 1937, Serial No. 176,005

2 Claims. (Cl. 134—67)

This invention relates to a novel and improved type of colored pigment, and more particularly to the use of lead cyanamide as a new yellow pigment.

I have found that lead cyanamide is notably useful as an improved type of lemon-yellow pigment, its pigmentary properties being so excellent as to render it superior to many previously known yellow pigments. For instance, I have found that the pigment characteristics of lead cyanamide not only surpass those exhibited by the low tinting strength and poor opacity zinc and barium chromates, but at least equal and in many instances exceed the pigmentary properties which the well-known lead chromates manifest. Furthermore, I have found that lead cyanamide possesses a much desired combination of pigment properties which are greatly superior to and not found in other colored cyanamide salt pigments, such as those of copper or cadmium, and that these improved properties are wholly unexpected and unpredictable from the properties exhibited by said other colored cyanamide salts. Thus, I have discovered that lead cyanamide not only possesses the very valuable pigmentary properties of very high opacity, coupled with bright mass tone, but in combination therewith exhibits excellent covering power, high tinctorial strength, excellent fastness towards light and, of essential importance, imparts rust and corrosion-inhibiting properties to paints and coating compositions in which the pigment may be employed.

The lead cyanamide pigment useful in the present invention may be readily prepared from easily available materials and by a well-known simple replacement reaction. Thus, I preferably react a soluble lead salt, such as lead nitrate, with calcium cyanamide in ammoniacal solution, and obtain as a precipitate a bright yellow powder consisting of lead cyanamide. Although this method of preparation is indicated as preferential, it is obvious preparation of the pigment is not limited thereto, since it may be prepared by other known and available methods, all of which are contemplated as within the scope of the invention.

In order that the invention may be more clearly understood, the following illustrative examples are given, none of which shall be considered as limiting the scope of my invention:

Example I 126 grams of commercial calcium cyanamide (63.5% pure) are stirred vigorously for 2 hours in 2000 cc. of cold water and the insoluble material removed by filtration. 100 cc. of aqua ammonia are then added followed by 331 grams of lead nitrate in 2000 cc. of cold water. The bright yellow precipitate is filtered, washed free of salts, and dried at 60°–75° C.

Example II 103 parts of sodium cyanamide of 84% purity are dissolved in 2000 parts of cold water, stirred well and made ammoniacal with 150 parts of 23% aqua ammonia and finally filtered from any insoluble material. The pigment is precipitated by adding 331 parts of lead nitrate crystals dissolved in 2000 parts of water. After stirring 30 minutes, the suspension is filtered, washed and dried. The yield is about 95% of the theoretical.

Example III

Lead cyanamide from Example I above is formulated into a printing ink in the conventional manner by grinding, say, one part of pigment and one part of lithographic varnish, say, No. 1 Transparent, on a three roller mill until it is completely dispersed in the vehicle. When the resulting ink is compared to the usual yellow pigments of a similar shade it is found to be comparable to a zinc chromate yellow in strength. It has good light-fastness and has a brighter mass tone and is much more opaque than either a zinc yellow or a primrose shade of lead chromate yellow.

Example IV 80 parts of lead cyanamide from Example I and 20 parts of Prussian Blue are mixed and ground into a suitable vehicle such as linseed oil. The resulting coating composition has a desirable grass green color.

While the foregoing examples embody the use of my novel lead cyanamide pigment as an essential ingredient of printing inks and paints, it is to be understood use of the pigment is contemplated in other well-known compositions, such as nitrocellulose lacquers, synthetic resin enamels, linoleum and paper coating mixtures, as well as an ingredient in rust and corrosion inhibiting coating compositions.

As indicated, the colored lead cyanamide of the present invention is an excellent and superior type of yellow pigment, exhibiting a combination of pigmentary properties which are not present or obtainable in the yellows mentioned or in other metal cyanamide salts, such as those of cadmium or copper. My novel lead cyanamide pigment has a potential cost comparable to that of the well-known chrome yellows. It possesses the highly desirable property of very high opacity, coupled with bright mass tone, and at least equals and in many instances surpasses the covering and drying power attributes of the chrome yellows. Its fastness towards light is excellent, being particularly noticeable when tested on a comparable basis against the yellow pigments mentioned. Similarly, its purity of shade is excellent and highly retentive and not subject to darkening to orange-yellow shades. When mixed with other types of pigments of either organic or inorganic origin, its purity of shade still persists and is beneficially imparted to the mixture with the result that a very desirable composite pigment results. Similarly, it may be incorporated in suitable adulterants or extenders, such as clay talc, calcium carbonate, calcium sulfate, etc., with beneficial pigmentary effects.

It will be found that my novel lead cyanamide pigment, because of its excellent covering and drying power, is useful for obtaining stable coating compositions, and that it is particularly useful as an anti-corrosion or rust-inhibiting agent in paint or coating compositions to be applied to metallic surfaces. Thus, the pigment can be incorporated into various oil type binders, such as treated or untreated drying oils or modifications or derivatives of the same, i. e., oil modified polyhydric-polybasic acid resins and phenol-formaldehyde resin varnishes, or in other types of binders, such as varnishes or resins. Similarly, the pigment can be mixed in a suitable vehicle with other pigments having some corrosion inhibiting characteristics, but relatively poor in covering power, such as zinc yellow, and the resultant coating compositions will thus exhibit exceedingly high corrosion-inhibiting properties, and when a single coating is applied to a metallic surface, will afford a highly satisfactory covering for such surface.

I claim as my invention:

1. A new pigment composition containing as an essential ingredient lead cyanamide, said pigment being of high tinctorial strength and opacity, excellent in light-fastness and adapted to impart corrosion-resistant characteristics to coating compositions.

2. A new colored pigment composition containing as an essential ingredient lead cyanamide of high tinting strength and fastness towards light.

CHARLES DANGELMAJER.